US012716122B2

(12) United States Patent
Kusunoki et al.

(10) Patent No.: US 12,716,122 B2
(45) Date of Patent: Aug. 25, 2026

(54) RESIN MOLDED BODY

(71) Applicant: Panasonic Intellectual Property Management Co., Ltd., Osaka (JP)

(72) Inventors: Tomokazu Kusunoki, Osaka (JP); Kanji Sakuragi, Osaka (JP); Shinji Fujimoto, Aichi (JP); Koichi Masukawa, Kyoto (JP)

(73) Assignee: Panasonic Housing Solutions Co., Ltd., Osaka (JP)

( * ) Notice: Subject to any disclaimer, the term of this patent is extended or adjusted under 35 U.S.C. 154(b) by 0 days.

(21) Appl. No.: 16/970,372

(22) PCT Filed: Mar. 28, 2019

(86) PCT No.: PCT/JP2019/013709

§ 371 (c)(1),
(2) Date: Aug. 16, 2020

(87) PCT Pub. No.: WO2019/208092

PCT Pub. Date: Oct. 31, 2019

(65) Prior Publication Data

US 2021/0087667 A1 Mar. 25, 2021

(30) Foreign Application Priority Data

Apr. 23, 2018 (JP) ................................ 2018-082585

(51) Int. Cl.
*C23C 4/11* (2016.01)
*C08K 3/22* (2006.01)
*C23C 4/02* (2006.01)

(52) U.S. Cl.
CPC .................. *C23C 4/11* (2016.01); *C08K 3/22* (2013.01); *C23C 4/02* (2013.01); *C08K 2003/2227* (2013.01)

(58) Field of Classification Search
CPC . C08J 7/043; C08J 7/0423; C08J 5/043; C08J 2367/06; C08J 2433/04; C08J 2463/00; C08J 2463/02; C23C 4/11; C23C 4/02; C08K 3/22; C08K 2003/2227
See application file for complete search history.

(56) References Cited

U.S. PATENT DOCUMENTS

| | | | | |
|---|---|---|---|---|
| 4,419,302 | A * | 12/1983 | Nishino | A61M 11/042<br>261/DIG. 65 |
| 4,704,328 | A | 11/1987 | Imao | |
| 2015/0031798 | A1* | 1/2015 | Rocks | H01B 3/40<br>525/122 |
| 2015/0337106 | A1* | 11/2015 | Kajihara | C03C 8/14<br>523/458 |
| 2018/0029194 | A1* | 2/2018 | Keipert | B24D 3/06 |
| 2018/0363120 | A1* | 12/2018 | Wada | C23C 18/52 |
| 2019/0055344 | A1* | 2/2019 | Tanaka | C08G 59/621 |

FOREIGN PATENT DOCUMENTS

| | | | | |
|---|---|---|---|---|
| DE | 3042922 | A1 | 7/1982 | |
| EP | 3266607 | A1 | 1/2018 | |
| JP | 60-214958 | A | 10/1985 | |
| JP | 61-098534 | A | 5/1986 | |
| JP | 64-021085 | A | 1/1989 | |
| JP | 2-025555 | A | 1/1990 | |
| JP | H2-26674 | A | 1/1990 | |
| JP | H05106014 | A * | 4/1993 | |
| JP | 3013831 | U | 7/1995 | |
| JP | H11-61373 | A | 3/1999 | |
| JP | 2001-240953 | A | 9/2001 | |
| JP | 2007-56357 | A | 3/2007 | |
| JP | 2018-059398 | A | 4/2018 | |
| WO | 2017/179545 | A1 | 10/2017 | |
| WO | WO-2018190420 | A1 * | 10/2018 | A47B 96/18 |

OTHER PUBLICATIONS

JP 2001-240953A machine translation. 6 pages (Year: 2001).*
Motocross Action Magazine, "Ten Things You Need to Know about Carbon Fiber", 2019, online, https://motocrossactionmag.com/10-things-you-need-to-know-about-carbon-fiber-how-to-care-for-it/ (Year: 2019).*
Passive Components, "Coefficient of Linear Thermal Expansion on Polymers Explained", 2022, online, https://passive-components.eu/coefficient-of-linear-thermal-expansion-on-polymers-explained/?nowprocket=1 (Year: 2022).*
Machine translation of Kobayashi et al. JP H05106014 A (Year: 1993).*
Machine Translation of Masukawa et al. WO 2018190420 A1 (Year: 2018).*
International Preliminary Report on Patentability for corresponding Application No. PCT/JP2019/013709, mailed Nov. 5, 2020, English translation.
Extended European Search Report for corresponding application No. 19792945.8 issued on May 20, 2021.
Japanese Office Action corresponding application No. 2020-516139 issued on Mar. 30, 2021, English translation.
International Search Report for corresponding Application No. PCT/JP2019/013709, mailed Jun. 25, 2019.

(Continued)

*Primary Examiner* — Callie E Shosho
*Assistant Examiner* — Bethany M Miller
(74) *Attorney, Agent, or Firm* — Renner, Otto, Boisselle & Sklar, LLP

(57) ABSTRACT

A resin molded body includes a resin structure, an intermediate layer including an inorganic filler and an organic resin binder and provided on a surface of at least a part of the resin structure, and a thermal sprayed ceramic coating provided on the intermediate layer. The inorganic filler is amorphous in shape and has a central particle diameter of 20 μm or more and 100 μm or less. The intermediate layer has a thickness of 50 μm or more and 250 μm or less. The central particle diameter a of the inorganic filler and the thickness b of the intermediate layer satisfy the relationship of $b \geq 2a$, and the inorganic filler is contained in the intermediate layer in an amount of 40% to 65% as a volume ratio.

6 Claims, 4 Drawing Sheets

(56) References Cited

OTHER PUBLICATIONS

Office Action including Chinese Search Report for corresponding Chinese Application No. 201980011108.1 issued on May 30, 2022 together with Machine English translation of the Office Action including Chinese Search Report and English translation of Chinese Search Report.

Second Office Action for corresponding Chinese Application No. 201980011108.1 issued on Oct. 21, 2022 and its English Machine translation.

Office Action for corresponding Chinese Application No. 201980011108.1 issued on Mar. 18, 2023 and its English Machine translation.

Notice of Reexamination issued in corresponding Chinese Application No. 201980011108.1 issued May 6, 2026 and its English machine translation.

* cited by examiner (a) Molding process
10
(b) Roughening process
10
(c) Undercoating process
10a
12
11
10
(d) Thermal spraying process
7
100
11
12
10a
10
(e) Sealing resin impregnating process
10c
12
11
10a
10

RESIN MOLDED BODY

TECHNICAL FIELD

The present invention relates to a resin molded body.

BACKGROUND ART

Kitchen counters made of marble are preferably used as housing equipment, especially kitchen counters from the viewpoint of heat resistance and aesthetics. For example, a sink in which a coating layer made of enamel glass is formed on a base material made of a metal such as stainless steel is also used. However, in recent years, it has been investigated to use a resin molded body having a thermal sprayed ceramic coating on its surface as housing equipment for water used area such as a system kitchen, a unit bath, a washstand, and a toilet from the viewpoint of heat resistance, aesthetics, workability, and lightweight. However, the resin molded body having a thermal sprayed ceramic coating on its surface has a problem that the adhesive property between the resin structure and the thermal sprayed ceramic coating is weak. Hence, Patent Literature 1 discloses that a thermal sprayed ceramic coating is formed by forming an intermediate layer containing an inorganic filler having a thermal conductivity of a certain value or more and an organic binder between the resin structure and the thermal sprayed ceramic coating.

CITATION LIST

Patent Literature

Patent Literature 1: JP-A-60-214958

DISCLOSURE OF INVENTION

Technical Problems

However, the conventional resin molded body having a thermal sprayed ceramic coating on its surface has a problem that the adhesive strength between the thermal sprayed ceramic coating and the resin structure is not sufficient.

Accordingly, an object of the present invention is to provide a resin molded body in which the adhesive strength between a thermal sprayed ceramic coating and a resin structure is high.

Solution to Problems

In order to achieve the object, the resin molded body according to the present invention includes (a) a resin structure;

(b) an intermediate layer that contains an inorganic filler and an organic resin binder and is provided on a surface of at least a part of the resin structure; and (c) a thermal sprayed ceramic coating provided on the intermediate layer.

The shape of the inorganic filler is amorphous, and the central particle diameter of the inorganic filler is 20 μm or more and 100 μm or less.

The thickness of the intermediate layer is 50 μm or more and 250 μm or less, the central particle diameter "a" of the inorganic filler and the thickness "b" of the intermediate layer satisfy b≥2a, and the amount of the inorganic filler contained in the intermediate layer is 40% to 65% as a volume percentage.

Advantageous Effects of Invention

According to the present invention configured as described above, it is possible to provide a resin molded body in which the adhesive strength between a thermal sprayed ceramic coating and a resin structure is high.

BEST MODE FOR CARRYING OUT THE INVENTION

Figure 1:
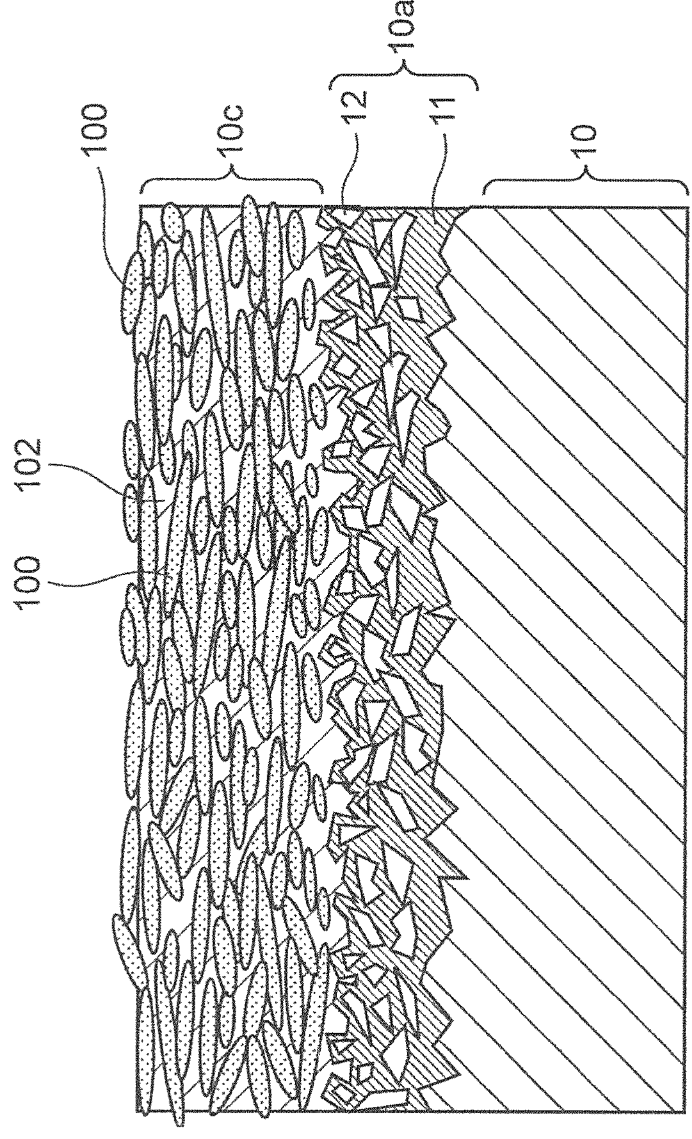
FIG. 1 is an enlarged sectional view illustrating a section of a resin molded body of an embodiment.

Hereinafter, a resin molded body of an embodiment according to the present invention will be described with reference to the drawings.

EMBODIMENTS

The resin molded body of an embodiment according to the present invention includes, for example, a resin structure 10 molded by cast molding, an intermediate layer 10*a* provided on the resin structure 10, and a thermal sprayed ceramic coating 10*c* provided on the intermediate layer 10*a*. The adhesive strength between the thermal sprayed ceramic coating and the resin structure is improved by forming the intermediate layer 10*a* using an organic resin binder containing an inorganic filler 12 and setting the shape of the inorganic filler 12, the central particle diameter of the inorganic filler 12, the amount of the inorganic filler 12 contained in the intermediate layer 10*a*, and the thickness of the intermediate layer 10*a* as to be described in detail later.

Hereinafter, the resin molded body 1 will be described in detail.

Resin Structure 10

In the resin molded body of the embodiment, the resin structure 10 is fabricated, for example, by cast molding. As the resin material for the resin structure 10, for example, various thermosetting resins such as an epoxy resin, a vinyl ester resin, an unsaturated polyester resin, and an acrylic resin are used. The resin structure 10 may contain an inorganic filler. By containing an inorganic filler, it is possible to improve the heat resistance of the resin structure 10 as well as it is possible to lower the coefficient of thermal expansion of the resin structure 10 and bring the coefficient of thermal expansion closer to the coefficient of thermal expansion of the thermal sprayed ceramic coating to be deposited later.

Intermediate Layer 10*a*

In the resin molded body of the embodiment, the intermediate layer 10*a* is a layer provided between the resin structure 10 and the thermal sprayed ceramic coating 10*c* in order to increase the adhesive strength between the resin structure 10 and the thermal sprayed ceramic coating 10*c*. The intermediate layer 10*a* is formed of, for example, a resin layer in which an inorganic filler 12 such as ceramic particles is added and dispersed. The intermediate layer 10*a* suppresses transfer of heat at the time of thermal spraying to the resin structure 10 and melting or deterioration of the resin. After thermal spraying, the stress caused by the difference in coefficient of thermal expansion between the thermal sprayed ceramic coating 10*c* and the resin structure 10 can be relaxed, and the durability of the resin molded body can be improved. As the organic resin binder 11 in the intermediate layer 10*a*, an epoxy resin, a polyester resin, a polyurethane resin, an acrylic resin, a phenol resin, a urea resin, a melamine resin, or a silicone resin can be used. The organic resin binder is preferably a reaction curable type that is cured by heat, UV or the like when the intermediate layer 10*a* is formed.

Among these, it is preferable to use an epoxy resin as the organic resin binder 11, and this makes it possible to form a high-strength intermediate layer 10*a* that is firmly attached to the resin structure 10. An epoxy resin easily attains firm adhesion regardless of the kind of resin forming the resin structure 10. The intermediate layer 10*a* formed of an epoxy resin exhibits high heat resistance and thus can withstand the heat load applied when forming the thermal sprayed ceramic coating and the heat load when using the molded body in which the thermal sprayed ceramic coating 10*c* is formed on the resin structure 10 as a product and the adhesive strength between the resin structure 10 and the ceramic coating 10*c* can be maintained for a long period of time. As the epoxy resin for organic resin binder 11, an epoxy resin containing at least one or more of a phenol novolac type epoxy resin, a cresol novolac type epoxy resin, a biphenyl type epoxy resin, or a naphthalene type epoxy resin is preferable in addition to a bisphenol A type epoxy resin. In the case of containing these heat resistant organic resin binders, the heat resistance of the intermediate layer 10*a* is favorable, and deformation of the irregular shape of the intermediate layer 10*a* at the time of ceramic thermal spraying can be suppressed, or thermal deterioration of the intermediate layer 10*a* at the time of thermal spraying can be prevented. In this manner, sufficient adhesive strength of the thermal sprayed ceramic coating 10*c* can be attained. As the epoxy resin for organic resin binder 11, one epoxy resin may be used.

As the inorganic filler 12 in the intermediate layer 10*a*, for example, particles of each of alumina, gray alumina, alumina titania, titania, alumina zirconia, spinel, mullite, and zirconia can be used. It is preferable that the inorganic filler 12 in the intermediate layer 10*a* contains at least one or more selected from a group consisting of alumina and a composite metal oxide containing an aluminum element. It is more preferable to contain at least one or more of inorganic fillers that are the same kind as the material for the thermal sprayed ceramic coating.

It is preferable that the inorganic filler 12 in the intermediate layer 10*a* contains at least one or more selected from a group consisting of aluminum, a metal capable of forming an alloy with aluminum, and an aluminum alloy containing metal elements thereof. Specifically, the inorganic filler 12 preferably contains one or more selected from the group consisting of Al, Ni, Cu, Mn, Si, Mg, Zn, and Li. The intermediate layer 10*a* can be formed by mixing the ceramic particles with the organic resin binder 11 and applying the mixture.

In the resin molded body of the embodiment, the adhesive strength between the resin structure 10 and the thermal sprayed ceramic coating 10*c* is increased as the intermediate layer 10*a* satisfies the following five conditions of the first to fifth conditions.

First condition: the inorganic filler 12 is amorphous in shape.

Second condition: the central particle diameter of the inorganic filler 12 is 20 μm or more and 100 μm or less.

Third condition: the thickness of the intermediate layer 10*a* is 50 μm or more and 250 μm or less.

Fourth condition: the central particle diameter "a" of the inorganic filler 12 and the thickness "b" of the intermediate layer 10*a* satisfy the relationship of $b \geq 2a$.

Fifth condition: the amount of the inorganic filler 12 contained in the intermediate layer 10*a* is 40% to 60% as a volume ratio.

Figure 3:
FIG. 3 is a scanning electron micrograph of a crushed inorganic filler used in Example 1.
Figure 4:
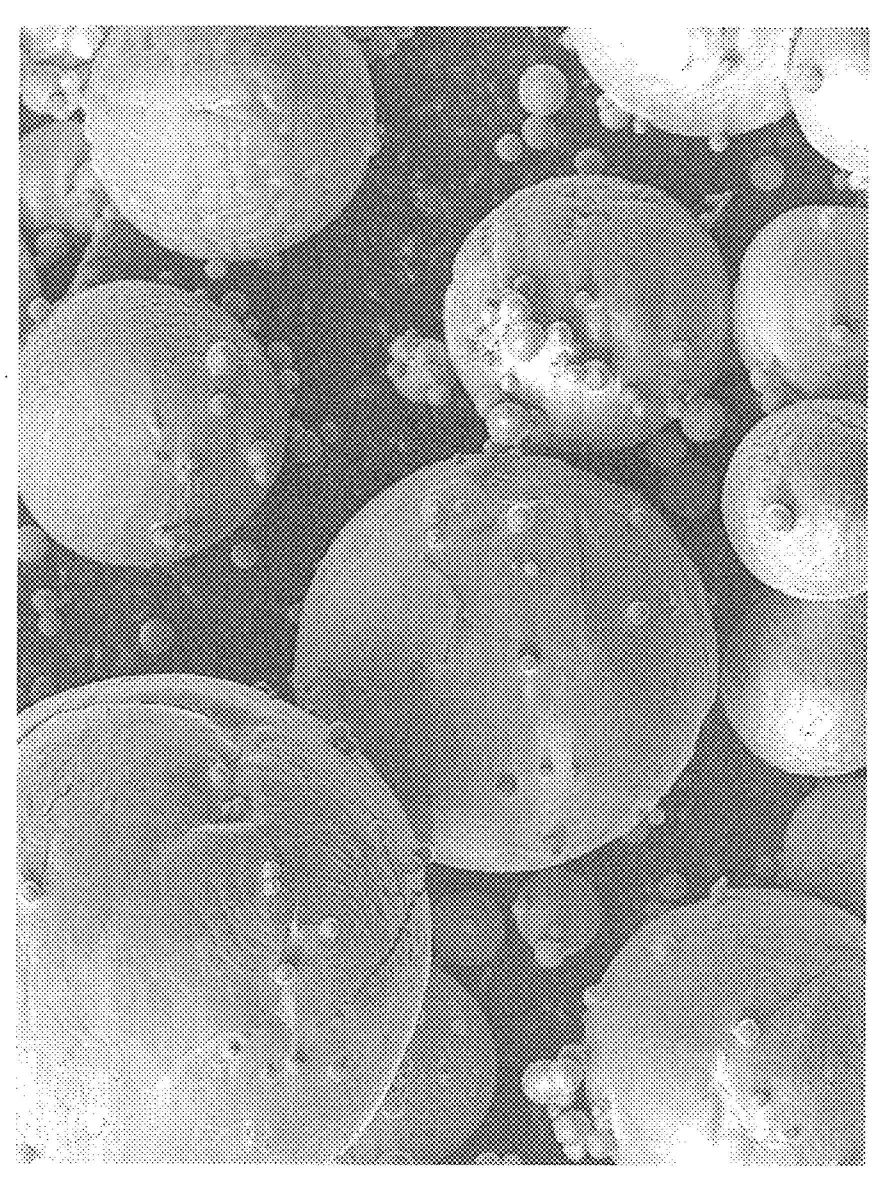
FIG. 4 is a scanning electron micrograph of a spherical inorganic filler used in Comparative Example 2.

The fact of the first condition that the inorganic filler 12 is amorphous in shape means a non-spherical inorganic filler excluding particles fabricated in a spherical shape by so-called build-up methods such as vapor phase growth and sol-gel methods. Specifically, as the inorganic filler 12, various inorganic fillers such as a crushed inorganic filler, a flaky inorganic filler, and a rod-shaped inorganic filler can be used. A crushed inorganic filler and a flaky inorganic filler can be fabricated by, for example, mechanical grinding such as a grinding method, and the rod-shaped inorganic filler can be fabricated by, for example, growth in which the inorganic filler grows at a fast speed in one direction so as to exhibit anisotropy. As an example of the crushed inorganic filler, a scanning electron micrograph of the crushed inorganic filler used in Example 1 to be described later is illustrated in FIG. 3. As an example of the spherical inorganic filler, a scanning electron micrograph of the spherical inorganic filler used in Comparative Example 2 to be described later is illustrated in FIG. 4.

In the present invention, a spherical filler can also be used in combination, but the surface roughness is likely to be small and the desired surface roughness cannot be attained when the intermediate layer 10*a* is formed using only a spherical filler. Inorganic fillers having various aspect ratios are used. One having an aspect ratio of 2 or more is preferable from the viewpoint that the surface roughness Rz of the intermediate layer 10*a* obtained is likely to be large. A powdery inorganic filler is preferred to a fibrous inorganic filler from the viewpoint of application property when forming the intermediate layer 10*a*. The central particle diameter of the inorganic filler 12 in the second condition is the particle diameter (particle diameter d50) defined by the median diameter. In the present invention, the "particle diameter d50" refers to the volume average particle diameter at which the cumulative volume calculated from the small diameter side is 50% in the particle diameter distribution (volume basis) measured by the laser diffraction method.

In the intermediate layer 10*a* of the embodiment configured as described above, it is possible to form irregularities on the surface of the intermediate layer 10*a* on which the thermal sprayed ceramic coating 10*c* is formed as illustrated in FIG. 1 and to increase the adhesive strength of the thermal sprayed ceramic coating 10*c* by the anchor effect.

In other words, in the resin molded body according to the present embodiment, the inorganic filler 12 satisfying the first condition and the second condition is selected as the inorganic filler 12 to be contained in the intermediate layer 10*a* and the content of the inorganic filler 12 with respect to the organic resin binder when forming the intermediate layer 10*a* is set so as to satisfy the fifth condition. The thickness of the intermediate layer 10*a* is set so as to satisfy the third condition and the fourth condition. In this manner, irregularities that can effectively exert an anchor effect is formed on the surface of the intermediate layer 10*a* when the thermal sprayed ceramic coating 10*c* is formed on the surface of the intermediate layer 10*a* and the adhesive strength of the thermal sprayed ceramic coating 10*c* is increased.

In more detail, for example, in the case of forming a thermal sprayed ceramic coating on the surface of a metal substrate, it is possible to secure the adhesive property of the thermal sprayed coating by forming irregularities on the surface of the metal substrate by blasting or machine cutting the surface of the metal substrate and forming a thermal sprayed ceramic coating on this surface.

However, unlike a metal substrate, it is difficult to roughen the surface by blasting or the like in the case of a structure formed of a resin. Generally, resin molding materials contain inorganic fillers and reinforcing fibers added to resins, and these additives may be exposed, a large irregular shape cannot be thus formed, and the strength of the resin base material itself may decrease when it is attempted to mechanically roughen the surface.

Hence, it has been investigated to form an intermediate layer as a ground layer (undercoat layer) on the surface on which the thermal sprayed ceramic coating is formed of the resin structure in order to form irregularities. As a result, it has been found out that the surface of the intermediate layer 10*a* is provided with irregularities capable of effectively exerting an anchor effect on the thermal sprayed ceramic coating 10*c* when the intermediate layer 10*a* is formed so as to satisfy the first to fifth conditions, and the present invention has been completed.

In other words, the surface shape of the intermediate layer 10*a* formed on the resin structure is closely related to the shape, central particle diameter, and content of the inorganic filler 12 to be contained in the intermediate layer 10*a* and the thickness of the intermediate layer 10*a* and the adhesive strength of the thermal sprayed coating changes as these conditions change. The surface shape of the intermediate layer 10*a* can be expressed by the surface roughness Rz, and the surface shape of the surface of the intermediate layer 10*a* can be a surface roughness Rz that can improve the adhesive strength of the thermal sprayed coating when the intermediate layer 10*a* is formed so as to satisfy the first to fifth conditions. Specifically, the surface roughness Rz of the surface of the intermediate layer 10*a* that can improve the adhesive strength of the thermal sprayed coating is preferably 10 μm or more and 200 μm or less, more preferably 30 μm or more and 170 μm or less, still more preferably a range of 40 μm or more and 130 μm or less. The most preferable range of the surface roughness Rz of the surface of the intermediate layer 10*a* is 30 to 70 μm.

As Rz of the surface of the intermediate layer 10*a* increases, the ceramic particles that melt and adhere during the thermal spraying more easily enter into an irregular shape portion of the intermediate layer 10*a* and the adhesive strength between the thermal sprayed coating and the resin base material increases. On the other hand, when the surface roughness Rz of the intermediate layer 10*a* is too large, the strength of the irregular shape portion of the intermediate layer 10*a* may decrease and the adhesive strength between the thermal sprayed coating and the resin base material may decrease. From this fact, the adhesive strength of the thermal sprayed coating is closely related to the average length Rsm of the roughness curve element representing the pitch-to-pitch distance of the surface roughness in addition to the surface roughness Rz of the intermediate layer 10*a*. In the range of the surface roughness Rz presented above, Rsm is in a range of 50 μm or more and 700 μm or less, preferably 100 μm or more and 600 μm or less, more preferably in a range of 200 μm or more and 500 μm or less. The most preferable range of the average length Rsm of the intermediate layer 10*a* is 100 to 400 μm.

The surface shape of the intermediate layer 10*a* is also related to the material composition used when forming the intermediate layer 10*a*, namely, the amount of the binder resin and the amount of the inorganic filler 12. The amount of the inorganic filler 12 contained in the intermediate layer 10*a* is preferably 40% or more and 65% or less, more preferably 42% or more and 57% or less, still more preferably 44% or more and 54% or less as a volume ratio. The surface roughness Rz can be increased when the amount of the inorganic filler 12 contained in the intermediate layer 10*a* is increased, but the strength of the intermediate layer 10*a* itself decreases and the adhesive strength decreases or the application property for forming the undercoat layer decreases when the amount of the inorganic filler 12 is too large. The same applies to the particle diameter of the inorganic filler 12, and the strength of the intermediate layer 10*a* itself decreases and the adhesive strength decreases or the application property when forming the intermediate layer 10*a* decreases when the particle diameter of the inorganic filler 12 is too large.

The surface roughness Rz of the intermediate layer 10*a* tends to increase when the thickness of the intermediate layer 10*a* is thin, but sufficient adhesive strength cannot be attained when the thickness of the intermediate layer 10*a* is too thin in comparison with the particle diameter of the inorganic filler 12. On the other hand, the surface roughness Rz of the intermediate layer 10*a* tends to decrease when the thickness of the intermediate layer 10*a* is too thick. When the thickness of the intermediate layer 10*a* is too thick, the inorganic filler 12 settles in the intermediate layer 10*a* and is nonuniformly distributed or the strength of the intermediate layer 10*a* itself decreases and sufficient adhesive strength cannot be attained. When the particle diameter of the inorganic filler is large and when the content is small, the inorganic filler settles in the coating film immediately after coating in some cases. When settling of the inorganic filler occurs, the surface roughness Rz of the intermediate layer 10*a* formed after curing tends to be small, and as a result, the thermal sprayed ceramic coating 10*c* does not have sufficient adhesive strength in some cases. In order to suppress settling of the inorganic filler in the coating material and the coating film before curing, it is preferable to blend an anti-settling agent or a viscosity modifier called a rheology control agent into the coating material. The viscosity modifier is not particularly limited, but those described below may be used. Polyethylene and amide can be used as an organic substance-based viscosity modifier, and bentonite, silica, sepiolite and the like can be used as an inorganic substance-based viscosity modifier. Among these, an amide-based viscosity modifier is preferable from the viewpoint of exhibiting heat resistance and not increasing the viscosity too much.

The resin molded body of the present embodiment has a thermal sprayed ceramic coating on the resin structure. When a ceramic is thermal sprayed to form a thermal sprayed ceramic coating, the coating is formed by high temperature spraying such as plasma spraying as to be described later. The ceramic thermal sprayed material thus melted by plasma spraying or the like collides with and adheres to the surface of the intermediate layer 10*a* at a significantly high temperature and a high speed to form a thermal sprayed coating. Hence, the surface of the intermediate layer 10*a* is likely to be deformed as the molten ceramic thermal sprayed material collides at a high speed. For this reason, it is required to set the surface shape and thickness of the intermediate layer 10*a* on the assumption that deformation occurs at the time of thermal spraying. That is, when the surface roughness Rz is too low, the irregularities of the intermediate layer 10*a* collapse at the time of thermal spraying and a sufficient anchor effect is not attained in some cases. When the thickness of the intermediate layer 10*a* is too thin, the thermal sprayed material penetrates through the intermediate layer 10*a* and reaches the resin structure and sufficient adhesive property is not attained in some cases.

The surface shape of the intermediate layer 10*a* described above, namely, the surface roughness Rz in a preferable range of the surface of the intermediate layer 10*a*, is set in consideration of the points described above. The inorganic filler 12 satisfying the first condition and the second condition is selected, and the intermediate layer 10*a* is formed so as to satisfy the third condition and the fourth condition. The content of the inorganic filler contained in the intermediate layer 10*a* is set so as to satisfy the fifth condition. This makes it possible to form the surface of the intermediate layer 10*a* in a shape having a surface roughness Rz in a preferable range.

Thermal Sprayed Ceramic Coating 10*c*

In the resin molded body 1 of the embodiment, the thermal sprayed ceramic coating 10*c* is a coating in which flat ceramic particles 100 are fused and deposited between adjacent ones as illustrated in FIG. 1. This thermal sprayed ceramic coating 10*c* is formed as a large number of heated and melted or softened ceramic particles collide with and are sequentially deposited on the surface of the resin structure 10 as to be described later. The ceramic material for this thermal sprayed ceramic coating 10*c* is not particularly limited to the following ones, but alumina, gray alumina, alumina titania, titania, alumina zirconia, spinel, mullite, zirconia and the like can be used. The thickness of the thermal sprayed ceramic coating 10*c* is, for example, in a range of 0.01 to 3.0 mm, preferably in a range of 0.05 to 1.0 mm, more preferably in a range of 0.2 to 0.5 mm when the uniformity of the thickness of the thermal sprayed ceramic coating on the base material and coating strength are regarded as important. The thickness of the thermal sprayed ceramic coating 10*c* is in a range of 0.01 to 3.0 mm, preferably 0.03 to 0.3 mm, more preferably 0.05 to 0.2 mm when the adhesive property between the ceramic thermal sprayed coating and the base material, the cracking of the ceramic thermal sprayed coating, and the material cost required for thermal spraying processing are regarded as important.

As described above, the thermal sprayed ceramic coating 10*c* is a coating in which the flat ceramic particles 100 are fused and deposited between adjacent ones and thus there are pores (gaps) between the ceramic particles 100 after thermal spraying. This thermal sprayed ceramic coating 10*c* may contain a resin filled in the gap portion. A resin 102 filled in the gap portion between the ceramic particles 100 can prevent water or oil from entering the inside of the thermal sprayed ceramic coating 10*c* and further improve the durability. The resin 102 filled in the gap portion of the thermal sprayed ceramic coating 10*c* is preferably a curable resin or a resin containing fluorine or silicon, and this makes for the thermal sprayed ceramic coating 10*c* hardly get dirty and facilitates cleaning.

The surface of the thermal sprayed ceramic coating 10*c* is preferably a polished surface, this provides excellent aesthetics, can suppress the attachment of dirt, and facilitates cleaning.

Next, a method for manufacturing the resin molded body 1 will be described with reference to FIG. 2.

Resin Structure Molding Process

In the present manufacturing method, the resin structure 10 is first fabricated by molding. For example, the resin structure 10 is fabricated by injecting a monomer resin into the cavity of a clamped mold and curing the monomer resin (cast molding). The method for molding the resin structure 10 is not limited to cast molding and may be, for example, press molding or injection molding.

Roughening Process

Figure 2:
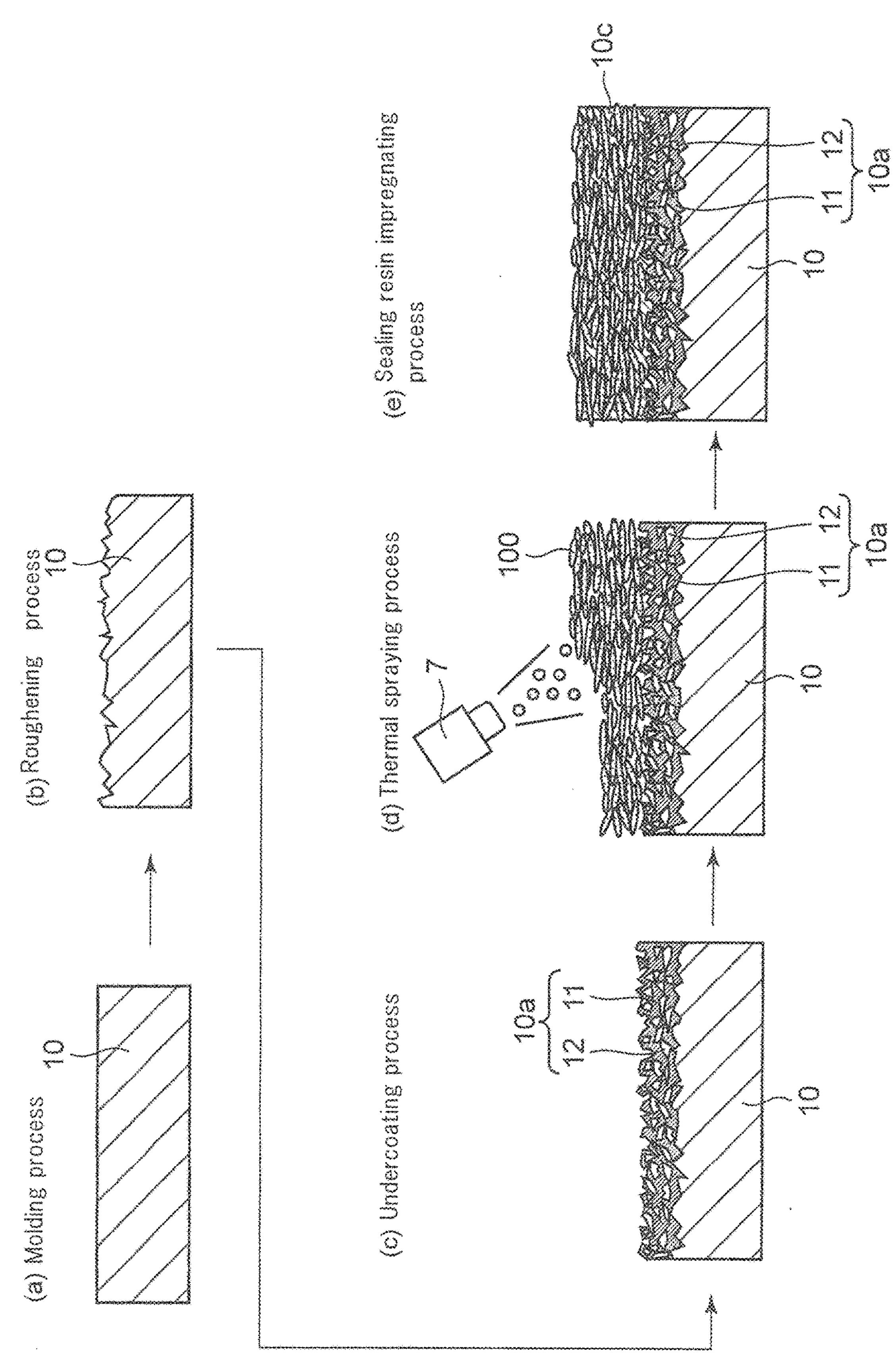
FIG. 2 is a diagram schematically illustrating flow of manufacturing processes of a resin molded body of an embodiment.

Next, at least the part on which the thermal sprayed ceramic coating 10*c* is formed of the surface of the resin structure 10 is roughened (FIG. 2(*b*)). Specifically, the surface is roughened by sandblasting, etching, or polishing with sandpaper so that, for example, the surface roughness should be Rz=1 to 100 μm, preferably Rz=5 to 50 μm, more preferably Rz=10 to 30 μm.

This roughening can increase the adhesive property between the resin structure 10 and the intermediate layer 10*a*. The adhesive property between the resin structure 10 and the intermediate layer 10*a* can be further increased by roughening the surface so as to have a surface roughness in the above range.

Intermediate Layer Forming Process

Next, the intermediate layer 10*a* is formed on the roughened surface of the resin structure 10 (FIG. 2(*c*)). The intermediate layer 10*a* is formed by, for example, mixing the inorganic filler 12 such as alumina with the organic resin binder 11 and applying the mixture. The shape of the inorganic filler 12 is amorphous, and the central particle diameter of the inorganic filler 12 is 20 μm or more and 100 μm or less. The above-mentioned epoxy resin can be used as the organic resin binder 11. This mixture of the organic resin binder 11 and the inorganic filler 12 can be applied on the roughened surface of the resin structure 10 by spray coating, coating with a coater, brush coating or the like. The surface roughness Rz and average length Rsm of the intermediate layer 10*a* in the present invention are required to be controlled while the intermediate layer 10*a* has a thickness of a certain value or more, and it is thus more preferable to form the intermediate layer 10*a* by spray coating among the coating methods. The intermediate layer 10*a* is formed so that the blended volume percentage of the organic resin binder 11 to the ceramic particles after drying is preferably 40% or more and 65% or less, more preferably 42% or more and 57% or less, still more preferably 44% or more and 54% or less.

The intermediate layer 10*a* is formed so that the thickness is 50 μm or more and 250 μm or less and the central particle diameter "a" of the inorganic filler 12 and the thickness "b" of the intermediate layer 10*a* satisfy the relationship of $b \geq 2a$.

Thermal Spraying Process

The thermal sprayed ceramic coating 10*c* is formed by allowing the melted or softened ceramic particles to collide with the intermediate layer 10*a* using the thermal spraying gun 7 to deposit the ceramic particles. The thermal spraying method can be selected from various thermal spraying methods such as flame spraying, arc spraying, laser spraying, and plasma spraying in consideration of the thermal spraying target, the working environment, and the like.

In the thermal spraying process, different ceramic particles may be simultaneously thermal sprayed using a plurality of thermal spraying guns 7 to form the thermal sprayed ceramic coating 10*c*. In this manner, for example, it is possible to impart changes in color of the surface and thus to improve the decorativeness. In the thermal spraying process, different ceramic particles may be alternately thermal sprayed using a plurality of thermal spraying guns to form the thermal sprayed ceramic coating 10*c*. In this manner, for example, it is possible to form a thermal sprayed ceramic coating having a plurality of functions such as corrosion resistance and heat resistance at the same time.

Sealing Resin Impregnating Process

A resin is impregnated (filled) into the pores of the thermal sprayed ceramic coating 10*c* formed by thermal spraying and the resin is cured (sealing treatment). As the resin to be impregnated, for example, an epoxy resin, an acrylic resin, a silicone resin or the like can be used. In this sealing treatment, when the thermal sprayed ceramic coating 10*c* is formed by thermal spraying, the coating immediately after thermal spraying has pores with a porosity of, for example, 1% to 10%. When such pores are present, there is a possibility that a substance that causes corrosion reaches the resin structure 10 through the pores and corrodes the resin structure 10. The sealing treatment is performed to prevent this. When a resin is contained in the pores of the thermal sprayed ceramic coating 10*c*, namely, the gap portions, the pores are blocked, and the gap portions are not contaminated, and cleaning is easy.

The resin molded body of the embodiment can be fabricated through the above processes.

EXAMPLES

The effects of the present invention were confirmed by the following Examples.

In Examples, a 4 mm-thick unsaturated polyester-based fiber-reinforced resin molded plate was first prepared as a resin structure.

Intermediate layer materials for forming the intermediate layers in Examples 1 to 6 and Comparative Examples 1 to 5 were each prepared.

The configurations of the materials for intermediate layer formation in Examples 1 to 6 and Comparative Examples 1 to 5 and the properties (film thickness, surface roughness Rz, Rsm) of the intermediate layers are presented in Table 1.

TABLE 1

| | | Comparative Example 1 | Comparative Example 2 | Example 1 | Comparative Example 3 | Example 2 | Example 3 | Comparative Example 4 | Example 4 | Comparative Example 5 | Example 5 | Example 6 |
|---|---|---|---|---|---|---|---|---|---|---|---|---|
| Trade name of filler | | A-42 | AX75-150 | AF180 | AF100 | K-11 | K-11 | K-11 | K-11 | K-11 | K-11 | K-11 |
| Distance for spray coating (mm) | | — | — | — | — | — | — | — | — | — | 200 | 300 |
| Blended proportion of coating material No. | | No. 2 | No. 2 | No. 2 | No. 2 | No. 2 | No. 2 | No. 2 | No. 3 | No. 1 | No. 4 | No. 4 |
| Level | | Difference in filler particle diameter | | | | Undercoat thickness | | | Filled amount of filler | | Spray coating | |
| Material for undercoat | Range of filler particle diameter | — | — | 53-90 | 106-150 | 53-10 | 53-10 | 53-10 | 53-10 | 53-10 | 53-10 | 53-10 |
| | Filler particle diameter d50 | 5 | 72 | 63 | 125 | 30 | 30 | 30 | 30 | 30 | 30 | 30 |
| | Filler shape | Non-spherical Crushed | Spherical Spherical | Non-spherical Crushed | Non-spherical Crushed | Non-spherical Crushed | Non-spherical Crushed | Non-spherical Crushed | Non-spherical Crushed | Non-spherical Crushed | Non-spherical Crushed | Non-spherical Crushed |
| | Filled amount (vol %) | 46 | 46 | 46 | 46 | 46 | 46 | 46 | 51 | 20 | 4 | 46 |
| Properties of undercoat | Film thickness (μm) | 200 | 200 | 200 | 200 | 100 | 200 | 300 | 200 | 200 | 80 | 150 |
| | Surface roughness Rz (μm) | 8.09 | 62.65 | 160 | 355.5 | 45 | 47 | 43 | 70.5 | 7.605 | 40 | 120 |
| | Rsm (μm) | 52.95 | 535 | 783 | 1284 | 217.5 | 216.7 | 378.5 | 382 | 103 | 150 | 400 |
| Adhesive strength (MPa) | | x | x | 0.5 | Δ | 0.7-1.5 | 1-2 | x | 2-2.5 | x | 2-2.5 | 4-7 |

Adhesive strength x: coating is peeled off immediately after thermal spraying
Adhesive strength Δ: adhesive strength is too weak to be measured The trade names of fillers presented in Table 1 are the following fillers, respectively.

A-42: product name "A-42" manufactured by SHOWA DENKO K.K.

AX75-150: product name "AX75-150" manufactured by NIPPON STEEL & SUMIKIN MATERIALS Co., Ltd. MICRON Co.

AF180: product name "AF180" manufactured by SINTOKOGIO, LTD.

AF100: product name "AF100" manufactured by SINTOKOGIO, LTD.

K-11: product name "K-11" manufactured by SHOWA DENKO K.K.

FIG. 3 illustrates a scanning electron micrograph of the crushed inorganic filler (AF180) used in Example 1, and FIG. 4 illustrates a scanning electron micrograph of the spherical inorganic filler (AX75-150) used in Comparative Example 2.

Here, the particle diameter d50 of the inorganic filler was measured by the laser diffraction method described above under the following measurement conditions.

Specifically, 100 mg of the inorganic filler was weighed, and the particle diameter distribution of the weighed inorganic filler was measured using a laser diffraction/scattering type particle diameter distribution measuring apparatus (Model number "Microtrac MT3300EX-II" manufactured by Nikkiso Co., Ltd.). The central particle diameter (d50) at which the cumulative volume calculated from the small diameter side is 50% in each particle diameter distribution (volume basis) measured is presented in Table 1 as the particle diameter (μm) of the filler used as a raw material.

The range of the filler particle diameter is presented by the minimum value and maximum value in each particle diameter distribution measured above.

Nos. 1 to 4 of the blended proportions of coating materials presented in Table 1 indicate that the coating materials are each blended at the proportions presented in Table 2. The blended proportions in Table 2 are presented as a weight ratio.

TABLE 2

| | | No. 1 | No. 2 | No. 3 | No. 4 |
|---|---|---|---|---|---|
| Epoxy resin | XNR7426 (manufactured by Nagase ChemteX Corporation) | 43.8 | 20.4 | 17.5 | 19.3 |
| Curing agent | HY956 (manufactured by Nagase ChemteX Corporation) | 8.8 | 4.1 | 3.5 | 5.6 |
| Filler | | 47.5 | 75.5 | 79 | 75.1 |
| Viscosity modifier | 6900-10X (manufactured by Kusumoto Chemicals, Ltd.) | 0 | 0 | 0 | 1.5 |
| Diluent | Xylene | 0.0 | 4.0 | 4.5 | 0 |
| | n-Butanol | 0.0 | 3.0 | 3.4 | 0 |
| | MIBK | 0.0 | 3.0 | 3.4 | 0 |
| | PM | 0 | 0 | 0 | 15.7 |

As the coating material for intermediate layer 10*a* formation, the epoxy resin, curing agent, diluent, and viscosity modifier presented in Table 2 were weighed so as to be at the proportions presented in Table 2, and uniformly stirred using a disperser. Next, a filler was added thereto, and the mixture was stirred using a disperser until the filler was uniformly dispersed to prepare a coating material for intermediate layer.

Epoxy resin: bisphenol A type epoxy resin

Curing agent: modified aliphatic polyamine

Viscosity modifier: anti-sagging agent for non-aqueous coating material (fatty acid amide)

Diluent: xylene, n-butanol, methyl isobutyl ketone (MIBK)

Propylene Glycol Monomethyl Ether (PM)

In Examples 1 to 4, the coating materials No. 1 to No. 3 presented in Table 2 were applied to a 100×100 mm square unsaturated polyester-based fiber-reinforced resin molded plate (FRP) in predetermined thicknesses using an applicator capable of adjusting the film thickness by adjusting the interval.

The unsaturated polyester-based fiber-reinforced resin molded plate (FRP) coated with the coating material for intermediate layer 10*a* formation was subjected to a heat treatment at 40° C. for 2 hours in a drying furnace and then further subjected to a heat treatment at 100° C. for 30 minutes to fabricate a resin structure having an intermediate layer formed.

In Examples 5 and 6, the coating material No. 4 presented in Table 2 was applied to a 100×100 mm square FRP in a predetermined thickness using a spray coating apparatus. W200-251G (manufactured by ANEST IWATA Corporation) was used as a spraying gun, and spray coating was performed at a spraying air pressure of 0.3 MPa. In Examples 5 and 6, spray coating was performed by adjusting the distance from the tip of the spraying gun to the FRP in order to adjust the surface roughness Rz and Rsm of the intermediate layer 10*a*. After that, the FRP coated with the coating material for intermediate layer 10*a* formation by spray coating was subjected to a heat treatment at 40° C. for 2 hours in a drying furnace and then further subjected to a heat treatment at 100° C. for 30 minutes to fabricate a resin structure having an intermediate layer formed.

A thermal sprayed material (white alumina, product name: SURPREX AW50 (−45+10 μm) manufactured by FUJIMI CORPORATION) was thermally sprayed on each of the intermediate layers under the following conditions to form a thermal sprayed ceramic coating.

[Ceramic Thermal Spraying Method and Conditions]

Thermal spraying method: atmospheric pressure plasma spraying using robot equipped with thermal spraying gun Thermal spraying gun: (manufactured by Aeroplasma Corporation)

Plasma gas: Ar

Thermal spraying output: 24 kW

Scanning speed: 500 mm/s

Vertical scanning distance: 3 mm

Thermal spraying distance: 20 mm

Feed rate: 10 g/min

Number of passes: 5 to 20 passes

Under the above conditions, the number of passes, the amount of the thermal sprayed material supplied, and the operation speed of the coating target were appropriately adjusted to form the thermal sprayed ceramic coating so that the film thickness was the film thickness presented in Table 1.

The adhesive strengths of the thermal sprayed ceramic coatings formed on the intermediate layers in Examples 1 to 6 and Comparative Examples 1 to 5 are presented in Table 1.

Here, the adhesive strength was measured by the evaluation method prescribed in JIS K-5600-5-7.

As presented in Table 1, the adhesive strengths of the thermal sprayed ceramic coatings in Examples 1 to 6 formed on the intermediate layer 10*a* satisfying the first to fifth conditions described in the embodiment were practically acceptable. In Examples 5 and 6, it is possible to form an intermediate layer having a large Rz and a small Rsm in a thin film thickness since the intermediate layer is formed by spray coating. In this manner, it is possible to provide a resin molded body including a thermal sprayed ceramic coating that is excellent in adhesive property and appearance at low cost.

In contrast to the thermal sprayed ceramic coatings in Examples 1 to 6 above, the thermal sprayed ceramic coatings in Comparative Examples 1 to 5 formed on the intermediate layer lacking the first to fifth conditions were not practically acceptable since peeling off thereof occurred immediately after thermal spraying.

INDUSTRIAL APPLICABILITY

The resin molded body according to the present invention can be widely applied to, for example, housing equipment for water used area, and thus lightweight and highly durable housing equipment can be provided at low cost.

REFERENCE SIGNS LIST

7 thermal spraying gun
10 resin structure
10*a* intermediate layer
10*c* thermal sprayed ceramic coating
11 organic resin binder
12 inorganic filler
100 ceramic particle
102 resin

The invention claimed is:

1. A resin molded body comprising:

a resin structure comprising an inorganic filler;

an intermediate layer comprising an inorganic filler and an organic resin binder and provided on a surface of at least a part of the resin structure; and a thermal sprayed ceramic coating provided on the intermediate layer, wherein the thermal sprayed ceramic coating is a deposited coating of flat ceramic particles positioned adjacent to each other to form gap portions between each flat ceramic particle, the thermal sprayed ceramic coating contains a resin impregnated into said gap portions formed between the flat ceramic particles, and the resin is a fluorine based resin, and wherein a resin material for the resin structure is a thermosetting resin which is an epoxy resin, a vinyl ester resin, an unsaturated polyester resin or an acrylic resin, the inorganic filler of the resin structure enables a coefficient of thermal expansion of the resin structure and a coefficient of thermal expansion of the thermal sprayed ceramic coating to be made closer to each other as compared to a closeness of the coefficient of thermal expansion of the resin structure without the inorganic filler and the coefficient of thermal expansion of the thermal sprayed ceramic coating, a whole shape of the inorganic filler in the intermediate layer has a crushed shape and the inorganic filler has a particle diameter d50 of 20 μm or more and 100 μm or less, and wherein the intermediate layer has a thickness of 50 μm or more and 250 μm or less, and the central particle diameter a of the inorganic filler in the intermediate layer and the thickness b of the intermediate layer satisfy the relationship of $b \geq 2a$, and the inorganic filler in the intermediate layer is contained in the intermediate layer in an amount of 40% to 65% by volume.

2. The resin molded body according to claim 1, wherein the organic resin binder in the intermediate layer is an epoxy resin.

3. The resin molded body according to claim 2, wherein the organic resin binder in the intermediate layer comprises at least one or more of a phenol novolac based epoxy resin, a cresol novolac based epoxy resin, a biphenyl based epoxy resin, or a naphthalene based epoxy resin.

4. The resin molded body according to claim 1, wherein the inorganic filler in the intermediate layer comprises at least one or more selected from a group consisting of alumina and a composite metal oxide containing an aluminum element.

5. The resin molded body according to claim 1, wherein the inorganic filler in the intermediate layer contains one or more selected from a group consisting of Al, Ni, Cu, Mn, Si, Mg, Zn, and Li.

6. The resin molded body according to claim 1, wherein the intermediate layer has a surface roughness between 10 μm and 200 μm.

* * * * *